United States Patent
Williams et al.

(10) Patent No.: US 10,876,391 B2
(45) Date of Patent: Dec. 29, 2020

(54) TUNING PREDICTIONS OF WELLBORE OPERATION PARAMETERS

(71) Applicant: Halliburton Energy Services, Inc., Houston, TX (US)

(72) Inventors: Robert Lynn Williams, Spring, TX (US); Aidan James Porter, Lancashire (GB); Vitor Lopes Pereira, The Woodlands, TX (US); Joshua Samuel Gollapalli, The Woodlands, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 253 days.

(21) Appl. No.: 15/744,620

(22) PCT Filed: Aug. 27, 2015

(86) PCT No.: PCT/US2015/047287
§ 371 (c)(1),
(2) Date: Jan. 12, 2018

(87) PCT Pub. No.: WO2017/034587
PCT Pub. Date: Mar. 2, 2017

(65) Prior Publication Data
US 2018/0202280 A1    Jul. 19, 2018

(51) Int. Cl.
*G06F 11/30* (2006.01)
*E21B 47/00* (2012.01)
(Continued)

(52) U.S. Cl.
CPC ............. *E21B 47/00* (2013.01); *E21B 44/00* (2013.01); *G05B 13/048* (2013.01); *E21B 3/00* (2013.01);
(Continued)

(58) Field of Classification Search
CPC ..................................................... E21B 47/00
See application file for complete search history.

(56) References Cited

U.S. PATENT DOCUMENTS

| 6,665,117 B2 | 12/2003 | Neff et al. |
| 7,316,278 B2 | 1/2008 | Hutchinson |

(Continued)

FOREIGN PATENT DOCUMENTS

| CA | 2634328 | 8/2011 |
| CA | 2634470 | 5/2013 |

(Continued)

OTHER PUBLICATIONS

Holst et al., "Deviation Detection of Industrial Processes", ERCIM News No. 56, Jan. 2004, 2 pages.
(Continued)

*Primary Examiner* — Phuong Huynh
(74) *Attorney, Agent, or Firm* — Kilpatrick Townsend & Stockton LLP

(57) ABSTRACT

A system for use in a wellbore can include a computing device including a processing device and a memory device that stores instructions executable by the processing device. The instructions can cause the processing device to generate a predicted value of a parameter associated with a well environment or a wellbore operation. The instructions can also cause the processing device to determine a tuning factor for adjusting the predicted value based on historical data. The instructions can also cause the processing device to apply the tuning factor to the predicted value to generate a tuned predicted value. The instructions can further cause the processing device to generate an interface for display that includes a data point associated with the tuned predicted value plotted on a graph.

20 Claims, 10 Drawing Sheets

(51) Int. Cl.
  *G05B 13/04* (2006.01)
  *E21B 44/00* (2006.01)
  *E21B 3/00* (2006.01)
  *E21B 7/04* (2006.01)
  *E21B 19/00* (2006.01)
  *E21B 37/00* (2006.01)
  *E21B 47/12* (2012.01)

(52) U.S. Cl.
  CPC .............. *E21B 7/04* (2013.01); *E21B 19/00* (2013.01); *E21B 37/00* (2013.01); *E21B 47/12* (2013.01)

(56) References Cited

U.S. PATENT DOCUMENTS

| | | |
|---|---|---|
| 7,346,456 B2 | 3/2008 | Le Bemadjiel |
| 7,357,196 B2 | 4/2008 | Goldman et al. |
| 7,725,302 B2 | 5/2010 | Ayan et al. |
| 7,896,105 B2 | 3/2011 | Dupriest et al. |
| 7,953,587 B2 | 5/2011 | Bratton et al. |
| 8,527,249 B2 | 9/2013 | Jamison et al. |
| 8,818,779 B2 * | 8/2014 | Sadlier .................... E21B 44/00 175/24 |
| 8,996,346 B2 | 3/2015 | Zuo et al. |
| 9,175,557 B2 | 11/2015 | Iversen et al. |
| 9,187,088 B1 | 11/2015 | Ferguson et al. |
| 9,784,089 B2 | 10/2017 | Boone et al. |
| 10,113,910 B2 | 10/2018 | Brunk et al. |
| 2005/0216197 A1 | 9/2005 | Zamora et al. |
| 2005/0279532 A1 | 12/2005 | Ballantyne et al. |
| 2007/0179767 A1 | 8/2007 | Cullick et al. |
| 2011/0125476 A1 | 5/2011 | Craig |
| 2013/0124171 A1 | 5/2013 | Schuette et al. |
| 2013/0222390 A1* | 8/2013 | Ross ...................... G01V 11/00 345/440 |
| 2014/0076632 A1 | 3/2014 | Wessling et al. |
| 2014/0083681 A1 | 3/2014 | Taylor et al. |
| 2014/0326449 A1 | 11/2014 | Germain et al. |
| 2015/0081265 A1 | 3/2015 | Hantschel et al. |
| 2015/0226049 A1 | 8/2015 | Frangos et al. |
| 2016/0273346 A1 | 9/2016 | Tang et al. |
| 2018/0216443 A1 | 8/2018 | Williams et al. |

FOREIGN PATENT DOCUMENTS

| | | |
|---|---|---|
| WO | 2013119480 | 8/2013 |
| WO | 2015060865 | 4/2015 |
| WO | 2017034586 | 3/2017 |
| WO | 2017034588 | 3/2017 |

OTHER PUBLICATIONS

International Patent Application No. PCT/US2015/047278, "International Search Report and Written Opinion", dated May 19, 2016, 13 pages.
International Patent Application No. PCT/US2015/047287, "International Search Report and Written Opinion", dated May 19, 2016, 14 pages.
International Patent Application No. PCT/US2015/047289, "International Search Report and Written Opinion", dated May 19, 2016, 13 pages.
Vachkov et al., "Detection of Deviation in Performance of Battery Cells by Data Compression and Similarity Analysis", International Journal of Intelligent Systems, vol. 29, 2014, pp. 207-222.
U.S. Appl. No. 15/744,387, "Non-Final Office Action", dated Nov. 29, 2019, 10 pages.
CA2,991,573, "Office Action", dated Oct. 16, 2019, 5 pages.
CA2,992,704, "Office Action", dated Dec. 12, 2019, 5 pages.
CA2,992,710, "Office Action", dated Dec. 12, 2019, 4 pages.
U.S. Appl. No. 15/744,387, "Non-Final Office Action", dated May 14, 2020, 11 pages.
U.S. Appl. No. 15/747,017, Non-Final Office Action, dated Jun. 25, 2020, 13 pages.
David et al., "Achieving Drilling Excellence through Next Generation Workflows Enabled by Integrating Historical Drilling Data and Real Time Data", Society of Petroleum Engineers, Nov. 10-13, 2014, pp. 1-11.
Golden et al., "Fault Diagnostics Using Expert Systems", 30th Aerospace Sciences Meeting and Exhibit, Jan. 6-9,1992, pp. 1-6.
Nybo et al., "The Overlooked Drilling Hazard: Decision Making From Bad Data", Society of Petroleum Engineers Intelligent Energy International, Mar. 27-29, 2012, pp. 1-8.

* cited by examiner

| BIT DEPTH (FT) | MAXIMUM RUNNING SPEED (FT/MIN) | EQUIVALENT CIRCULATING DENSITY (ECD) (LBS/GALLON) |
|---|---|---|
| 7000 | -60 | 10.217 |
| 6200 | -70 | 10.202 |
| 5000 | -80 | 10.206 |
| 4600 | -90 | 10.220 |
| 4400 | -100 | 10.215 |
| 4200 | -110 | 10.212 |
| 4000 | -120 | 10.213 |

| BIT DEPTH (FT) | MAXIMUM RUNNING SPEED (FT/MIN) | EQUIVALENT CIRCULATING DENSITY (ECD) (LBS/GALLON) |
|---|---|---|
| 7000 | -70 | 10.227 |
| 6600 | -80 | 10.201 |
| 5400 | -90 | 10.204 |
| 4800 | -100 | 10.211 |
| 4600 | -110 | 10.206 |
| 4400 | -120 | 10.204 |

US 10,876,391 B2

TUNING PREDICTIONS OF WELLBORE OPERATION PARAMETERS

CROSS-REFERENCE TO RELATED APPLICATIONS

This application is related to International Patent Application No. PCT/US2015/047278 titled "Predicting Wellbore Operation Parameters," and International Patent Application No. PCT/US2015/047289 titled "Determining Sources of Erroneous Downhole Predictions," both of which were filed on Aug. 27, 2015. The entirety of both applications are hereby incorporated herein by reference.

TECHNICAL FIELD

The present disclosure relates generally to devices for use with well systems. More specifically, but not by way of limitation, this disclosure relates to a system for tuning predictions of wellbore operation parameters.

BACKGROUND

A well system (e.g., oil or gas wells for extracting fluid or gas from a subterranean formation) can include a wellbore. Various well tools can be used for performing operations in the wellbore. It can be desirable to predict a characteristic or effect of a wellbore operation prior to performing the wellbore operation. For example, it can be desirable to predict an amount of pressure generated by a drilling operation. It can be challenging to accurately predict the characteristics of the wellbore operation.

DETAILED DESCRIPTION

Figure 1:
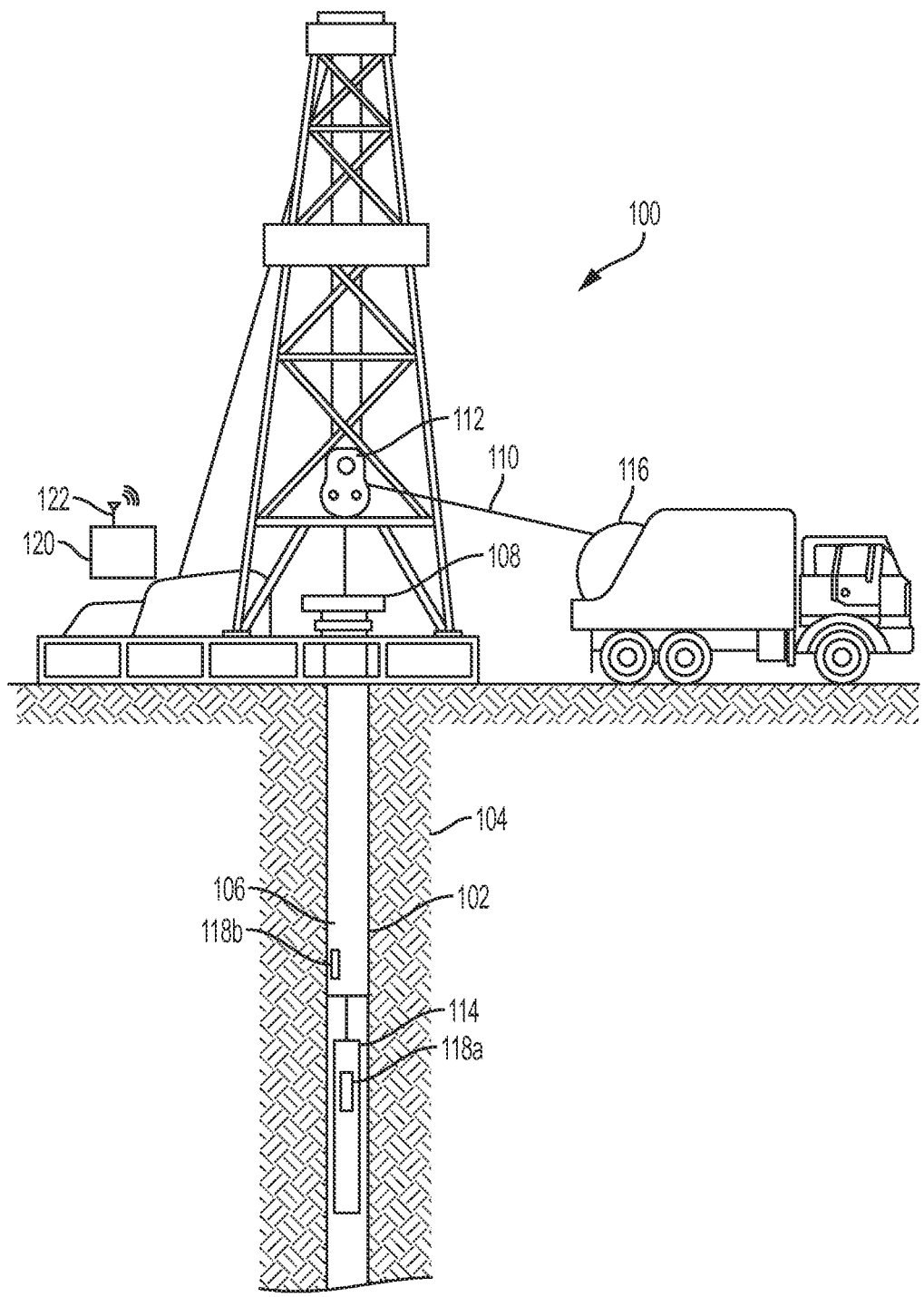
FIG. 1 is a cross-sectional view of an example of a well system that includes a system for tuning predictions of wellbore operation parameters according to some aspects.

Certain aspects and features of the present disclosure relate to a system for tuning a predicted value of a parameter associated with an environmental condition in a wellbore or with a wellbore operation. The system can generate the predicted value of the parameter and determine a tuning factor for adjusting the predicted value. The tuning factor can be determined based on historical data. The system can adjust the predicted value of the parameter using the tuning factor, the result of which can be a tuned predicted value that is more accurate than the original predicted value. The system can output the original predicted value, tuned predicted value, and a measured value of the parameter (e.g., from a sensor) via a visual user interface, such as a graph. A well operator can visually inspect the graph to determine the accuracy of the tuned predicted value (with respect to the measured value of the parameter) and confidently rely on future tuned predicted parameters for making decisions with respect to wellbore operations.

The system can determine the tuning factor based on historical data that includes multiple differences between previously predicted values of a parameter and previously measured values of the parameter (provided by a sensor). For example, the system can determine a predicted value of a parameter and measure a value of the parameter using a sensor. The system can subtract the measured value of the parameter from the predicted value to determine a difference between the two. The difference can make up a single data point of the historical data. The system can iterate this process to accumulate multiple data points making up the historical data.

In some examples, the system can determine the tuning factor by applying linear regression analysis, a moving average, or a running average to the historical data. For example, the system can determine the tuning factor by applying a moving average to the n most recent data points making up the historical data.

In some examples, the system can determine a prediction interval associated with the tuned predicted value. For example, the system can determine a lower boundary of the prediction interval and an upper boundary of the prediction interval. The system can output the lower boundary and the upper boundary on a graph (e.g., along with the original predicted value, tuned predicted value, and a measured value of the parameter). The prediction interval can be used to demonstrate the effectiveness and reliability of the tuned predicted value.

In some examples, the system can determine a different parameter associated with the environmental condition in the wellbore or with a wellbore operation based on the tuned predicted value. For example, the system can use the tuned predicted value to optimize or otherwise determine at least a portion of a schedule (e.g., a maximum running speed) for pulling a well tool out of a hole, sometimes referred to as a pulling out of hole (POOH) operation. The system can more reliably determine the different parameter (e.g., the POOH schedule) by using the tuned predicted parameter rather than the original predicted parameter.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

FIG. 1 is a cross-sectional view of an example of a well system 100 that includes a system for tuning predictions of wellbore operations parameters according to some aspects. The well system 100 includes a wellbore 102 extending through various earth strata. The wellbore 102 extends through a hydrocarbon bearing subterranean formation 104. A casing string 106 extends from the surface 108 to the subterranean formation 104. The casing string 106 can provide a conduit through which formation fluids, such as production fluids produced from the subterranean formation 104, can travel from the wellbore 102 to the surface 108.

The well system 100 can also include at least one well tool 114 (e.g., a formation-testing tool). The well tool 114 can be coupled to a wireline 110, slickline, or coiled tube that can be deployed into the wellbore 102. The wireline 110, slickline, or coiled tube can be guided into the wellbore 102 using, for example, a guide 112 or winch. In some examples, the wireline 110, slickline, or coiled tube can be wound around a reel 116.

The well system 100 includes one or more sensors 118a-b. The sensors 118a-b can detect one or more parameters associated with an environment in the wellbore 102, a wellbore operation (e.g., the operation of the well tool 114 in the wellbore 102), or both and transmit associated sensor data to a computing device 120. The sensors 118a-b can be positioned in the well tool 114, the casing string 106, or elsewhere in the well system 100. The sensors 118a-b can be of the same type or can be different. Examples of the sensors 118a-b can include a pressure sensor, a temperature sensor, a microphone, an accelerometer, a depth sensor, a resistivity sensor, a vibration sensor, a fluid analyzer or detector, an ultrasonic transducer, or any combination of these.

The well system 100 can include the computing device 120. The computing device 120 can be positioned at the surface 108, below ground, or offsite. The computing device 120 can include a processor interfaced with other hardware via a bus. A memory, which can include any suitable tangible (and non-transitory) computer-readable medium, such as RAM, ROM, EEPROM, or the like, can embody program components that configure operation of the computing device 120. In some aspects, the computing device 120 can include input/output interface components (e.g., a display, keyboard, touch-sensitive surface, and mouse) and additional storage.

The computing device 120 can communicate with the sensors 118a-b via a communication device 122. The communication device 122 can represent one or more of any components that facilitate a network connection. In the example shown in FIG. 1, the communication device 122 is wireless and can include wireless interfaces such as IEEE 802.11, Bluetooth, or radio interfaces for accessing cellular telephone networks (e.g., transceiver/antenna for accessing a CDMA, GSM, UMTS, or other mobile communications network). In other examples, the communication device 122 can be wired and can include interfaces such as Ethernet, USB, IEEE 1394, or a fiber optic interface. An example of the computing device 120 is described in greater detail with respect to FIG. 3.

In some examples, the computing device 120 can determine a predicted value of a parameter associated with the environment in the wellbore 102 or a wellbore operation (e.g., operating the well tool 114 in the wellbore 102). The wellbore operation can include running a tubular (e.g., pipe) into the wellbore 102, removing the tubular from the wellbore 102, circulating a fluid through the wellbore 102, cleaning the wellbore 102, making a connection between two well system components (e.g., two well tools or tubulars), a drilling operation (e.g., slide drilling or rotary drilling), idling, and/or any other operation occurring in the wellbore 102. The sensors 118a-b can measure the parameter and transmit associated sensor data to the computing device 120. The computing device 120 can receive the sensor data and compare the predicted value to the measured parameters to determine a difference between the two. The difference can be $\Delta p$. The computing device 120 can store the $\Delta p$ in memory. The computing device 120 can analyze one or more previous $\Delta p$ values to determine a tuning factor. In some examples, the computing device 120 can determine the tuning factor by applying linear regression analysis to, or determining a running or moving average of, the previous $\Delta p$ values. The computing device 120 can subtract the tuning factor from, or add the tuning factor to, the predicted value to generate a tuned predicted value. The tuned predicted value can be more accurate than the original predicted value. In some examples, the well operator or the computing device 120 can use the tuned predicted value to perform a wellbore operation or simulate a wellbore operation. For example, the computing device 120 can use the tuned predicted value as an input to a simulator to more accurately predict the outcome of a particular wellbore operation.

Figure 2:
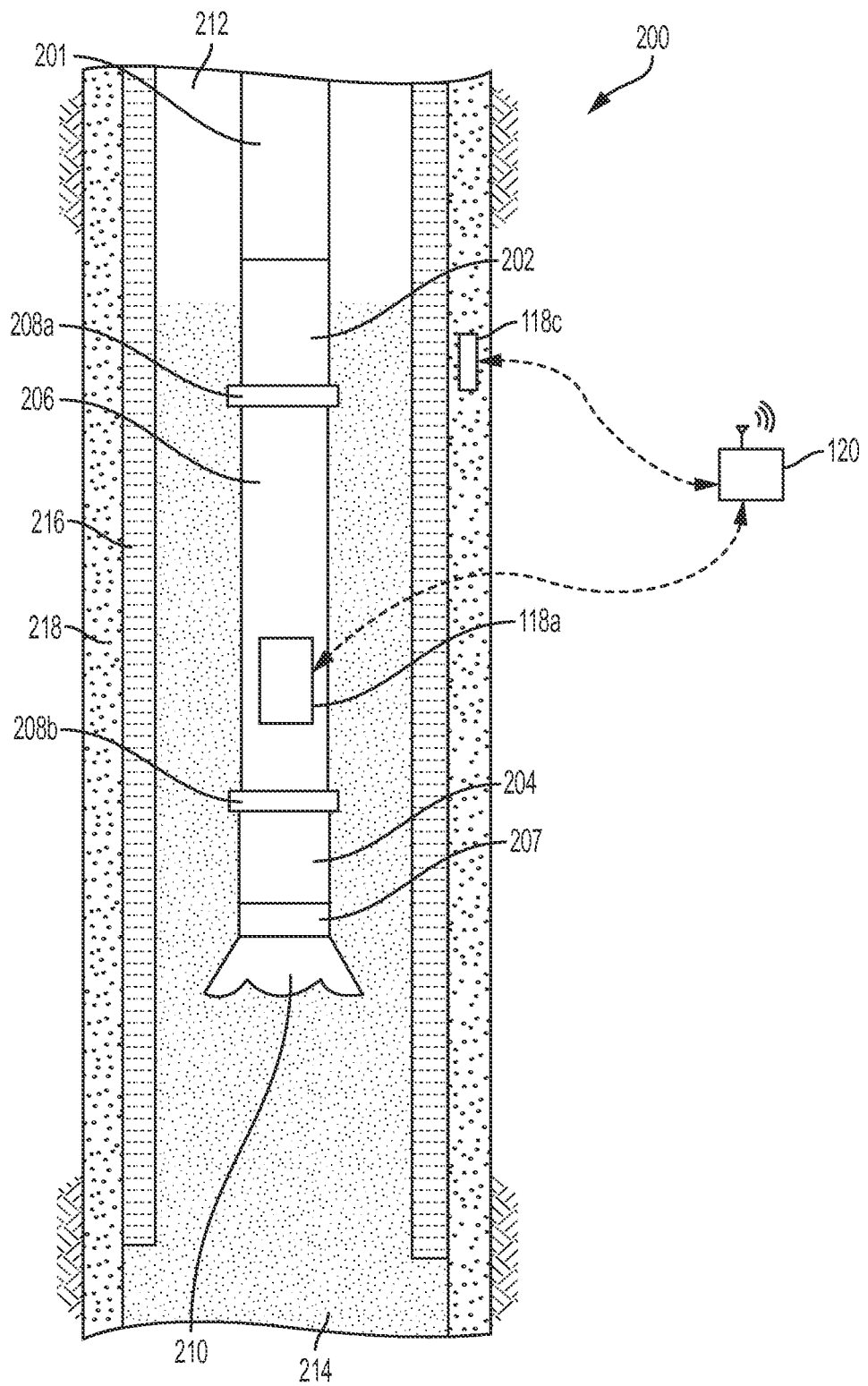
FIG. 2 is a cross-sectional view of an example of a part of a well system that includes a system for tuning predictions of wellbore operation parameters according to some aspects.

FIG. 2 is a cross-sectional view of an example of a well system 200 that includes a system for tuning predictions of wellbore operation parameters according to some aspects. In this example, the well system 200 includes a wellbore. The wellbore can include a casing string 216 and a cement sheath 218. In some examples, the cement sheath 218 can couple the casing string 216 to a wall of the wellbore. In some examples, the wellbore can include fluid 214. An example of the fluid 214 can include mud. The fluid 214 can flow in an annulus 212 positioned between a well tool 201 and a wall of the casing string 216.

The well tool 201 can be positioned in the wellbore. In some examples, the well tool 201 is a measuring-while-drilling tool. For example, the well tool 201 can include a logging-while-drilling tool, a pressure-while-drilling tool, a temperature-while-drilling tool, or any combination of these. The well tool 201 can include various subsystems 202, 204, 206, 207. For example, the well tool 201 can include a subsystem 202 that includes a communication subsystem. The well tool 201 can also include a subsystem 204 that includes a saver subsystem or a rotary steerable system. A tubular section or an intermediate subsystem 206 (e.g., a mud motor or measuring-while-drilling module) can be positioned between the other subsystems 202, 204. The well tool 201 can include a drill bit 210 for drilling the wellbore. The drill bit 210 can be coupled to another tubular section or intermediate subsystem 207 (e.g., a measuring-while-drilling module or a rotary steerable system). In some examples, the well tool 201 can include tubular joints 208a-b. Tubular joints 208a-b can allow the well tool 201 to bend or can couple various well tool subsystems 202, 204, 206 together.

The well system 200 includes one or more sensors 118a, 118c. The sensors 118a, 118c can be of the same type or can be different. The sensors 118a, 118c can be positioned in the well tool 201, the cement sheath 218, or elsewhere in the well system 200. The sensors 118a, 118c can communicate with computing device 120 via a wired or wireless interface.

The computing device 120 can use sensor data from the sensors 118a, 118c for tuning predicted values of well system parameters (e.g., parameters associated with an environment in the wellbore, the operation of the well tool 201, and/or another wellbore operation). The tuned predicted values can be more accurate than the original, untuned predicted values. A well operator or the computing device 120 can use the tuned predicted values to perform a wellbore operation or simulate a wellbore operation. For example, the computing device 120 can use the tuned predicted values as inputs to one or more simulators to optimize or more accurately predict the outcome of particular wellbore operations.

Figure 3:
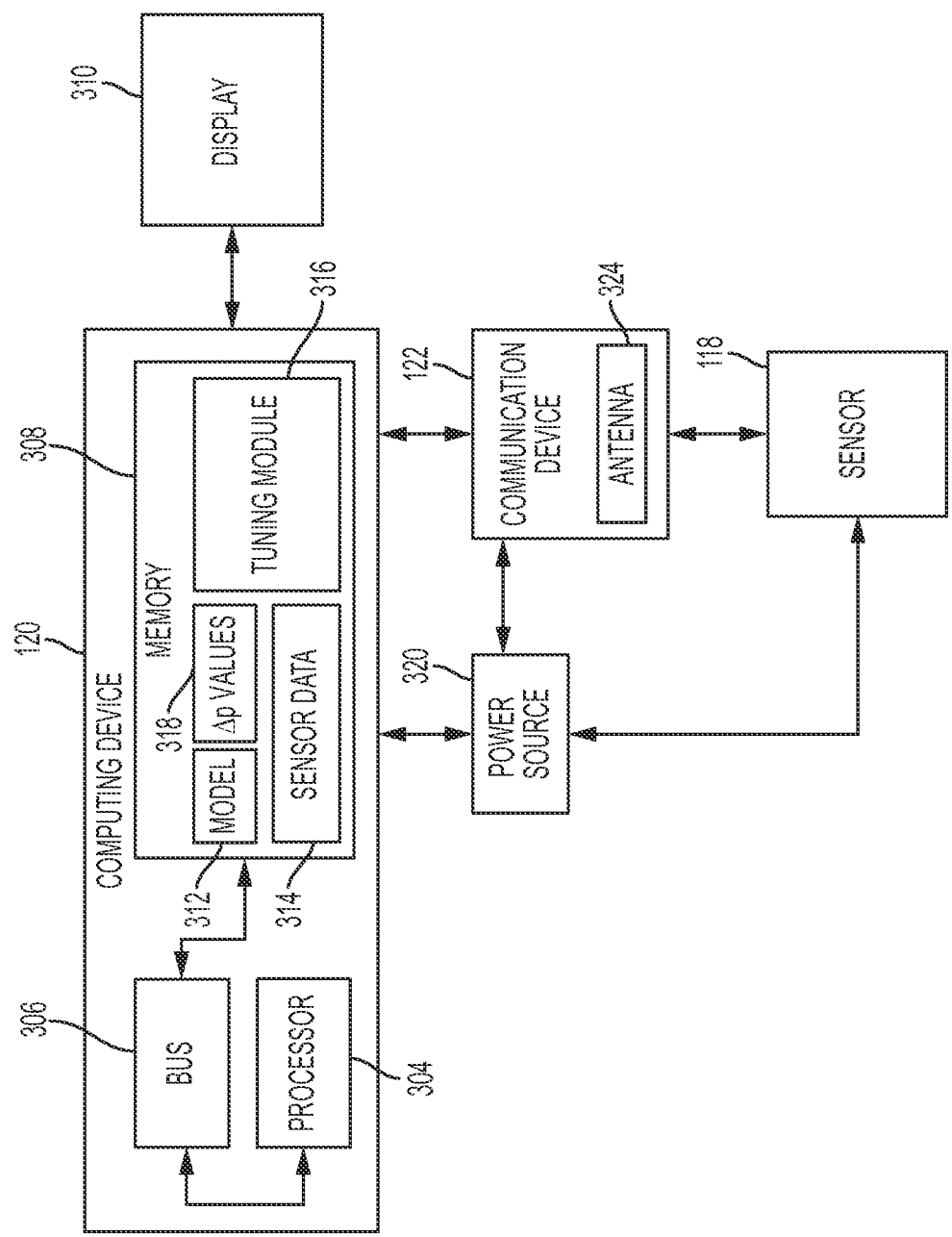
FIG. 3 is a block diagram of an example of a system for tuning predictions of wellbore operation parameters according to some aspects.

FIG. 3 is a block diagram of an example of a system for tuning predictions of wellbore operation parameters according to some aspects. In some examples, the components shown in FIG. 3 (e.g., the computing device 302, power source 320, display 310, and communication device 122) can be integrated into a single structure. For example, the components can be within a single housing. In other examples, the components shown in FIG. 3 can be distributed (e.g., in separate housings) and in electrical communication with each other.

The computing device 120 a processor 304, a memory 308, and a bus 306. The processor 304 can execute one or more operations for tuning predictions of wellbore operation parameters. The processor 304 can execute instructions stored in the memory 308 to perform the operations. The processor 304 can include one processing device or multiple processing devices. Non-limiting examples of the processor 304 include a Field-Programmable Gate Array ("FPGA"), an application-specific integrated circuit ("ASIC"), a microprocessor, etc.

The processor 304 can be communicatively coupled to the memory 308 via the bus 306. The non-volatile memory 308 may include any type of memory device that retains stored information when powered off. Non-limiting examples of the memory 308 include electrically erasable and programmable read-only memory ("EEPROM"), flash memory, or any other type of non-volatile memory. In some examples, at least some of the memory 308 can include a medium from which the processor 304 can read instructions. A computer-readable medium can include electronic, optical, magnetic, or other storage devices capable of providing the processor 304 with computer-readable instructions or other program code. Non-limiting examples of a computer-readable medium include (but are not limited to) magnetic disk(s), memory chip(s), ROM, random-access memory ("RAM"), an ASIC, a configured processor, optical storage, or any other medium from which a computer processor can read instructions. The instructions can include processor-specific instructions generated by a compiler or an interpreter from code written in any suitable computer-programming language, including, for example, C, C++, C#, etc.

In some examples, the memory 308 can include a model 312. The model 312 can include one or more algorithms configured to predict a parameter associated with an environment in a well system or a wellbore operation (e.g., an operation of a well tool). The model 312 can be tuned for specific wellbore operations, such as rotary drilling, slide drilling, pulling a pipe out of a wellbore, running a pipe into the wellbore, circulating fluid through the well system, wellbore cleaning, or any combination of these. In some examples, the model 312 can include the equation:

$$ECD\ Value = Total\ Pressure/(0.052 * TVD)$$

where ECD Value is a predicted ECD value in ppg (pounds per gallon) at a given depth for one or more fluids (e.g., Newtonian or Non-Newtonian fluids) in a wellbore; TVD (true vertical depth) is a vertical depth of a wellbore in feet; and Total Pressure is in psi (pounds per square inch). In some examples, the model 312 can include the following equation for determining the Total Pressure:

$$Total\ Pressure = Hydrostatic\ Pressure + Annular\ Pressure\ Loss$$

In some examples, the model 312 can include the following equation for determining the Hydrostatic Pressure:

$$Hydrostatic\ Pressure = 0.052 * Mud\ Weight * TVD$$

where hydrostatic pressure is in psi; and Mud Weight is in ppg and can be determined by applying temperature and pressure compressibility and expansion effects to a surface Mud Weight. The surface Mud Weight can be measured using a mud scale. In some examples, the model 312 can include the following equation for determining the Annular Pressure Loss:

$$Annular\ Pressure\ Loss = (4 * Wall\ Shear\ Stress * Length)/(Outer\ Diameter - Inner\ Diameter)$$

where annular pressure loss is in psi; wall shear stress is in psi and includes a fluid shear stress at a wall of an annulus of the wellbore; length is the length of the annulus of the wellbore in feet; outer diameter is the outer diameter of the annulus of the wellbore in feet; and inner diameter is the inner diameter of the annulus of the wellbore in feet.

In some examples, the computing device 120 can determine an input (e.g., a value for a variable) for an equation (e.g., any of the above equations) based on sensor data 314 from a sensor (e.g., real-time sensor data from sensor 118), data input to the computing device 120 by a well operator, historical data about a well system, or any combination of these. For example, the computing device 120 can receive sensor signals from a mud scale indicative of a surface Mud Weight, extract sensor data 314 from the sensor signals, and store the sensor data 314 in memory 308. The computing device 120 can retrieve the sensor data 314 from memory 308 and use the sensor data 314 as an input to, for example, a Hydrostatic Pressure equation. As another example, the computing device 120 can receive input from a well operator (e.g., indicative of an outer diameter of an annulus of a wellbore) and store the input as data in memory 308. The computing device 120 can retrieve the data from memory 308 and use the data as an input to, for example, an Annular Pressure Loss equation As still another example, the computing device 120 can receive historical data about a well system and store the historical data in memory 308. The computing device 120 can retrieve the historical data and use at least a portion of the historical data as an input for an equation. In some examples, the computing device 120 can analyze the historical data to determine new information about the well system. The computing device 120 can use the new information as an input for an equation.

The memory 308 can also include sensor data 314 from a sensor 118. The sensor 118 can measure the parameter (associated with the environment in the well system or the wellbore operation) and transmit associated sensor signals to the computing device 120. The computing device 120 can receive the sensor signals via communication device 122, extract sensor data from the sensor signals, and store the sensor data 314 in memory 308. Examples of the sensors 118a-b can include a pressure sensor, a temperature sensor, a microphone, an accelerometer, a depth sensor, a resistivity sensor, a vibration sensor, a fluid analyzer or detector, an ultrasonic transducer, or any combination of these.

The memory 308 can also include one or more Δp values 318. The computing device 120 can determine a Δp value 318 by comparing a measured parameter (from the sensor 118) to an associated predicted parameter (e.g., from the model 312). The computing device can store the Δp value 318 in memory 308.

The memory 308 can include a tuning module 316. The tuning module 316 can include one or more algorithms for analyzing one or more Δp values 318 to determine a tuning factor. For example, the tuning module 316 can include algorithms for determining the tuning factor by applying linear regression analysis to, or determining a running or moving average of, at least a subset of the Δp values 318. The tuning module 316 can include an algorithm for subtracting the tuning factor from, or adding the tuning factor to, a predicted value (e.g., output by the model 312) to generate a tuned predicted value.

The computing device 120 can be in electrical communication with the communication device 122. The communication device 122 can include or can be coupled to an antenna 324. In some examples, part of the communication device 122 can be implemented in software. For example, the communication device 122 can include instructions stored in memory 308.

The communication device 122 can receive signals from remote devices (e.g., sensor 118) and transmit data to remote devices. For example, to transmit data to a remote device, the processor 304 can transmit one or more signals to the communication device 122. The communication device 122 can receive the signals from the processor 304 and amplify, filter, modulate, frequency shift, and otherwise manipulate the signals. The communication device 122 can transmit the manipulated signals to the antenna 124, which can responsively generate wireless signals that carry the data.

In some examples, the communication device 122 can transmit data via a wired interface. For example, the communication device 122 can transmit data via a wireline. As another example, the communication device 122 can generate an optical waveform. The communication device 122 can generate the optical waveform by pulsing a light emitting diode at a particular frequency. The communication device 122 can transmit the optical waveform via an optical cable (e.g., a fiber optic cable).

The computing device 120 can be in electrical communication with a display 310. The display 310 can receive signals from the processor 304 and output one or more associated images. For example, the display 310 can output a graph, such as the graphs shown in FIGS. 5-7. Examples of the display 310 can include a television, a computer monitor, a liquid crystal display (LCD), or any other suitable display device.

The computing device 120 is in electrical communication with a power source 320. The power source 320 can additionally or alternatively be in electrical communication with the communication device 122, the sensor 118, or both. In some examples, the power source 320 can include a battery for powering the computing device 120, the communication device 122, or the sensor 118. In other examples, power source 320 can include an electrical cable, such as a wireline, to which the computing device 120 can be coupled.

In some examples, the power source 320 can include an AC signal generator. The computing device 120 can operate the power source 320 to apply a transmission signal to the antenna 324. For example, the computing device 120 can cause the power source 320 to apply a voltage with a frequency within a specific frequency range to the antenna 324. This can cause the antenna 324 to generate a wireless transmission. In other examples, the computing device 120, rather than the power source 320, can apply the transmission signal to the antenna 324 for generating the wireless transmission.

Figure 4:
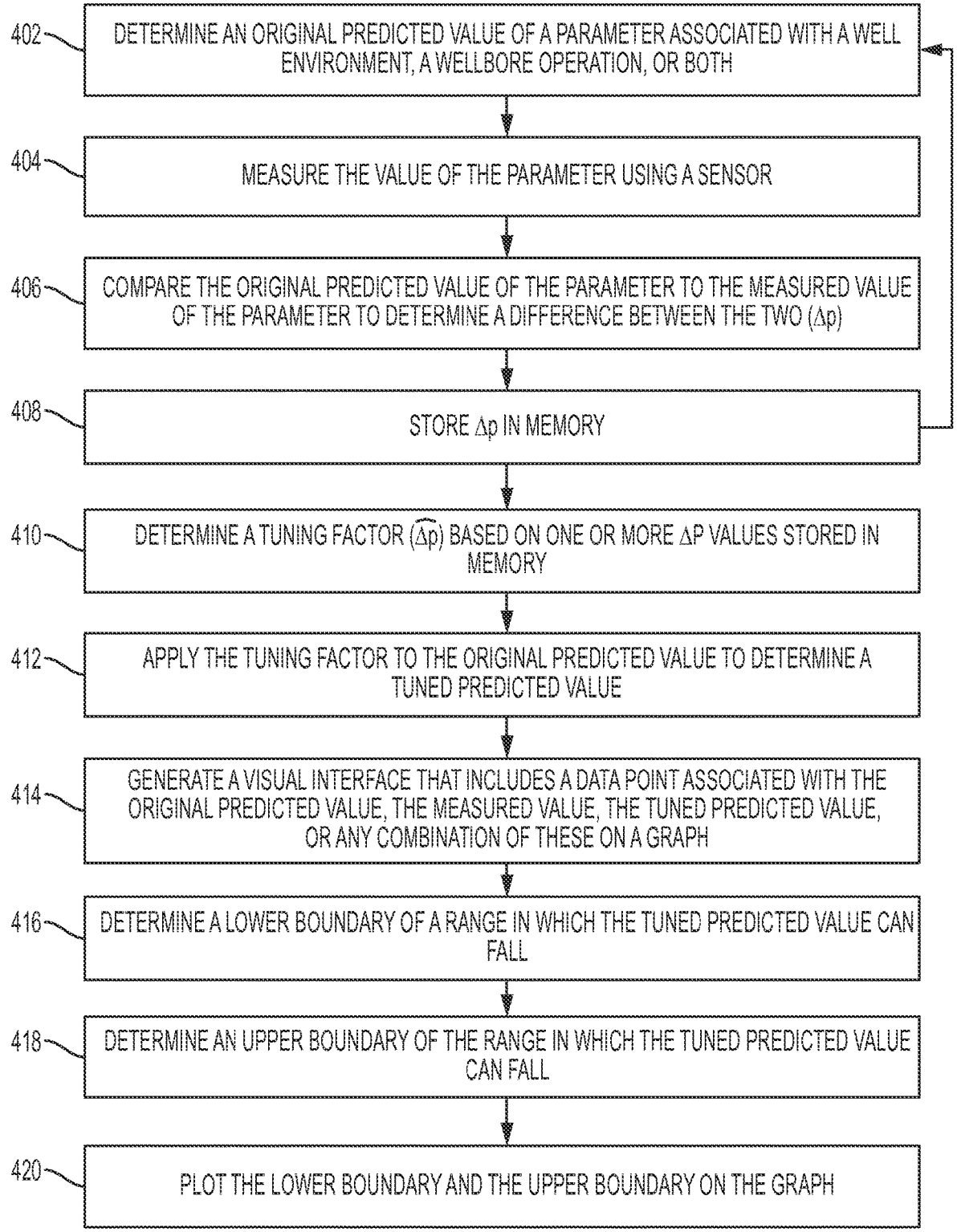
FIG. 4 is a flow chart of an example of a process for tuning predictions of wellbore operation parameters according to some aspects.

FIG. 4 is a flow chart of an example of a process for tuning predictions of wellbore operation parameters according to some aspects.

In block 402, the computing device 120 determines an original predicted value of a parameter associated with a well environment, a wellbore operation, or both. For example, the computing device 120 can predict an equivalent circulating density (ECD) of a fluid in a wellbore. The computing device 120 can use one or more models and apply one or more constraints to the models to predict the parameter of the well environment, the wellbore operation, or both. Examples of the constraints can include a known type of fluid in the wellbore, a depth of the wellbore, a temperature of the wellbore, a location of the wellbore, a characteristic of a subterranean formation out of which the wellbore is drilled, or any combination of these. In some examples, a user can input the constraints into the computing device 120 and the computing device 120 can store the constraints in memory (e.g., memory 308 of FIG. 3).

In block 404, the computing device 120 measures the value of the parameter (associated with the well environment, the wellbore operation, or both) using a sensor 118. The sensor 118 can detect one or more characteristics of the well environment, the wellbore operation (e.g., the operation of a well tool), or both and transmit an associated sensor signal to the computing device 120. The sensor signal can be an analog signal or a digital signal. For example, the sensor 118 can detect a pressure while drilling (PWD) a wellbore and transmit an associated sensor signal to the computing device 120. The computing device 120 can receive the sensor signal and extract sensor data from the sensor signal.

In block 406, the computing device 120 compares the original predicted value of the parameter to the measured value of the parameter to determine a difference between the two (Δp). For example, the computing device 120 can subtract the predicted ECD value from the measured PWD value to determine a difference between the two.

In block 408, the computing device 120 stores the difference between the two (Δp) in memory. The process can return to block 402 and iterate the steps of blocks 402-408 to generate multiple Δp values and store the Δp values in memory.

In block 410, the computing device 120 determines a tuning factor ($\widehat{\Delta p}$) based on one or more Δp values stored in memory. The tuning factor can be determined by analyzing any number Δp values. As the number of Δp values used in determining the tuning factor increases, the tuning factor can become more precise or evolve.

In some examples, the computing device 120 can determine the tuning factor using a moving average over the n most recent Δp values, which can be represented using the following equation:

$$\widehat{\Delta p}_{n+1} = \overline{\Delta p}$$

where $\overline{\Delta p}$ is the mean of the n most recent Δp values, and $\widehat{\Delta p}_{n+1}$ is the tuning factor.

Additionally or alternatively, the computing device 120 can determine $\widehat{\Delta p}$ using linear regression analysis. For example, the computing device 120 can determine a tuning factor for a specific drilling parameter, such as a rotary speed. The computing device 120 can use the following multivariate linear regression equation to determine the tuning factor for rotary speed:

$$\widehat{\Delta p}_{n+1} = \overline{\Delta p} + \frac{\sum_{1}^{n}(rpm - \overline{rpm})(\Delta p - \overline{\Delta p})}{\sum_{1}^{n}(rpm - \overline{rpm})^2} \times (rpm_{n+1} - \overline{rpm})$$

where rpm is a measured rotary speed (e.g., measured by a sensor) in revolutions per minute, $\overline{rpm}$ is the mean of the n most recent rpm values, $\Delta p$ is a difference between a predicted rotary speed and the measured rotary speed rpm, $\overline{\Delta p}$ is the mean of the n most recent $\Delta p$ values, and $\widehat{\Delta p}_{n+1}$ is the tuning factor.

In block 412, the computing device 120 applies (e.g., subtracts or adds) the tuning factor from the original predicted value to determine a tuned predicted value. For example, the computing device 120 can subtract (e.g., remove) a tuning factor ($\widehat{\Delta p}$) from an original predicted ECD value (ECD) to determine a tuned ECD value ($\widehat{ECD}$), as represented by the following equation:

$$\widehat{ECD} = ECD - \widehat{\Delta p}$$

Figure 5:
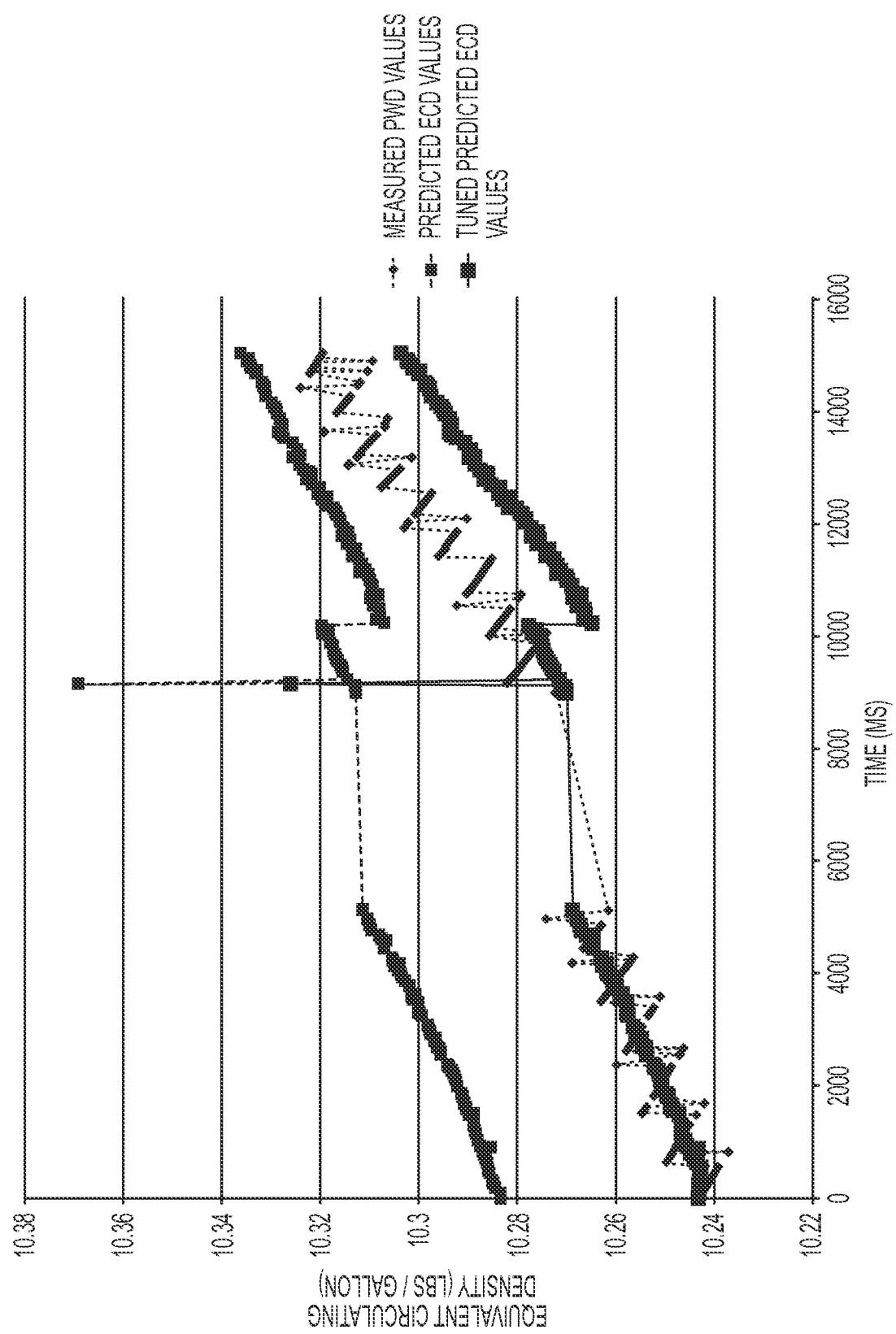
FIG. 5 shows a graph depicting predicted ECD values, measured PWD values, and tuned predicted ECD values generated using a moving average according to some aspects.
Figure 6:
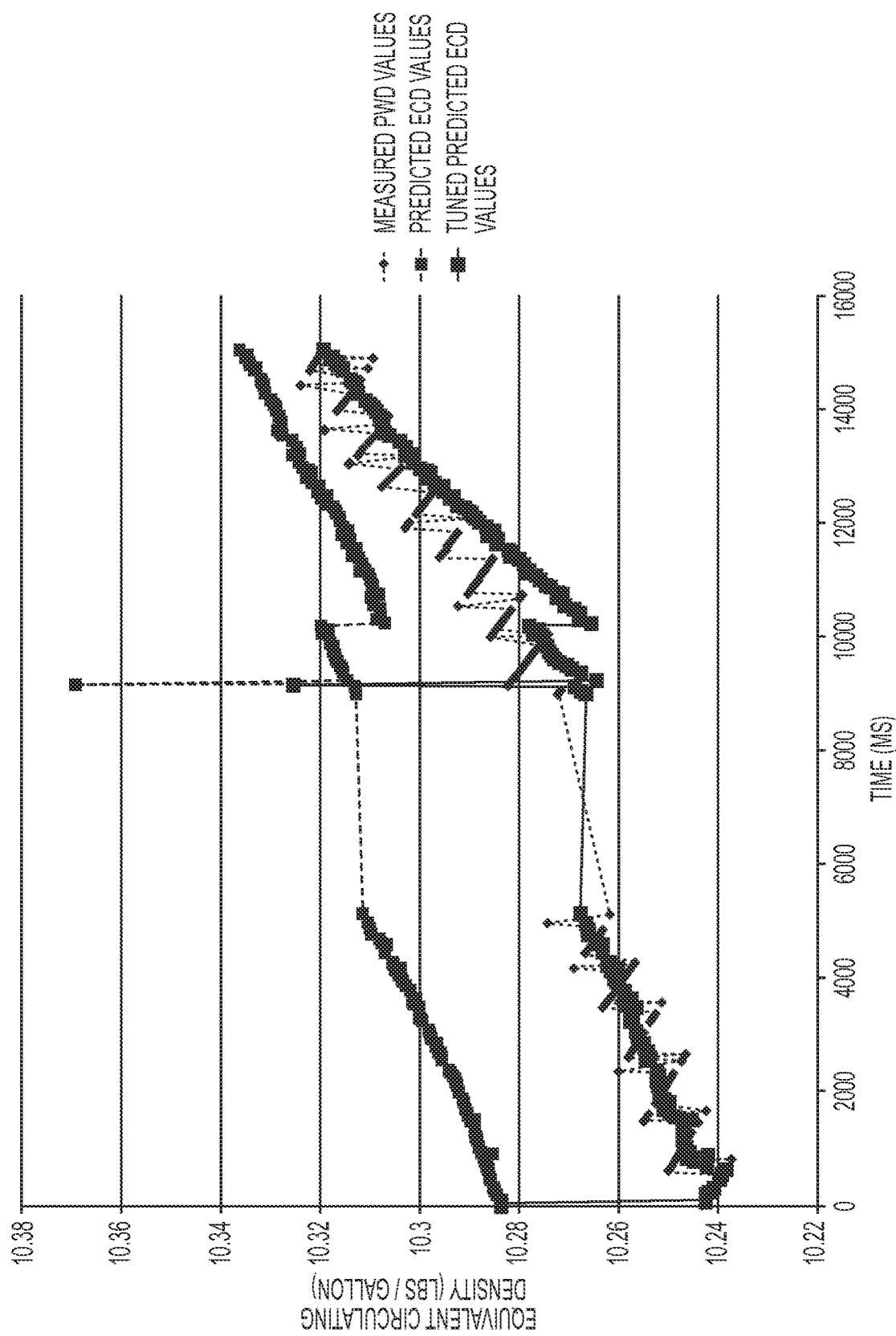
FIG. 6 shows a graph depicting predicted ECD values, measured PWD values, and tuned predicted ECD values generated using linear regression according to some aspects.

In block 414, the computing device 120 generates a visual interface that includes a data point associated with the original predicted value, the measured value, the tuned predicted value, or any combination of these on a graph. For example, FIG. 5 shows a graph depicting predicted ECD values, measured PWD values, and tuned predicted ECD values generated using a moving average. As another example, FIG. 6 shows a graph depicting predicted ECD values, measured PWD values, and tuned predicted ECD values generated using linear regression. The tuned predicted ECD values can be more accurate than (e.g., closer to the measured PWD values than) the untuned predicted ECD values. In some examples, the tuned predicted ECD values generated using linear regression can be more accurate than the tuned predicted values generated using a moving average.

In block 416, the computing device 120 determines a lower boundary ($B_{lower}$) of a range in which the tuned predicted value can fall. In some examples, the range can be a prediction interval. The computing device 120 can determine the lower boundary of the prediction interval using the following equation:

$$B_{lower} = \mu - z\sigma$$

where $\mu$ is the mean of the stored $\Delta p$ values, a is a standard deviation of the stored $\Delta p$ values, and z is a constant. In some examples, z can be 1.96 for a 95% prediction interval or 2.58 for a 99% prediction interval.

In block 418, the computing device 120 determines an upper boundary ($B_{upper}$) of the range in which the tuned predicted value can fall. For example, the computing device 120 can determine the upper boundary of the prediction using the following equation:

$$B_{upper} = \mu + z\sigma$$

The difference between the upper boundary and the lower boundary can make up the range (e.g., prediction interval) in which the tuned predicted value can fall.

Figure 7:
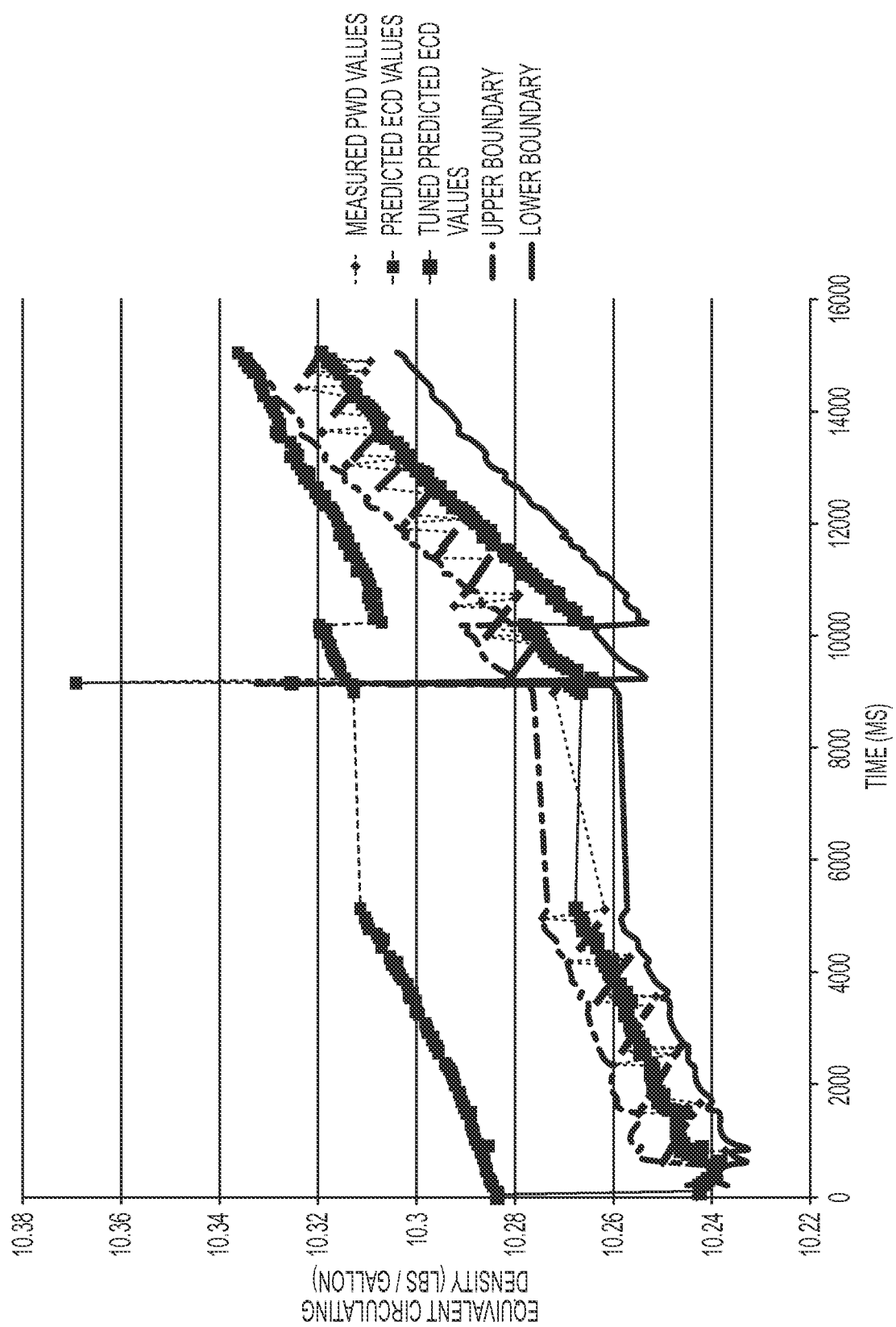
FIG. 7 shows the graph of FIG. 6 including an upper boundary and a lower boundary that defines a range in which tuned predicted ECD values can fall according to some aspects.

In block 420, the computing device 120 plots the lower boundary and the upper boundary on the graph. For example, FIG. 7 shows a graph depicting predicted ECD values, measured PWD values, tuned predicted ECD values, the upper boundary, and the lower boundary. A well operator can visually inspect the graph to determine that the tuned predicted ECD values fall within the range, which may indicate the accuracy of the predictions in a statistically significant manner.

Figure 8:
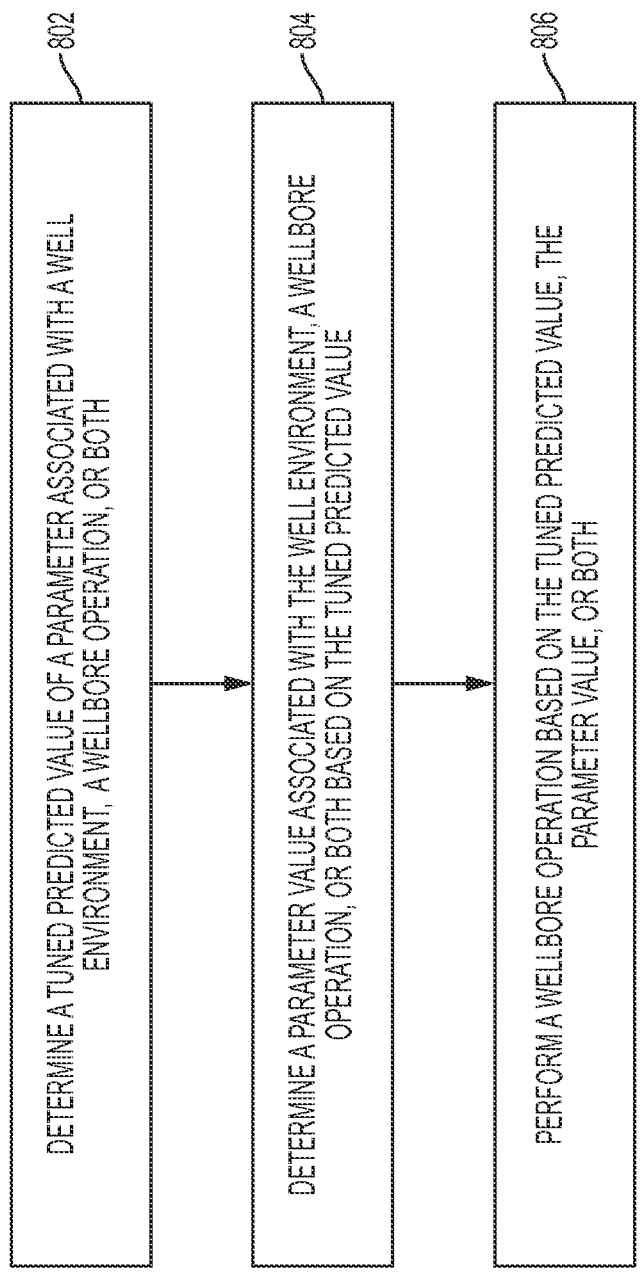
FIG. 8 is a flow chart of an example of a process for performing a well operation using a tuned predicted value according to some aspects.

FIG. 8 is a flow chart of an example of a process for performing a well operation using a tuned predicted value according to some aspects. Any number and combination of the blocks shown in FIG. 8 can be included in the process shown in FIG. 4.

In block 802, the computing device 120 determines a tuned predicted value of a parameter associated with a well environment, a wellbore operation (e.g., an operation of a well tool), or both. The wellbore operation can be a first wellbore operation. The computing device 120 can determine the tuned predicted value, for example, as described in blocks 402-412 of FIG. 4.

In block 804, the computing device 120 determines a parameter value associated with the well environment, a wellbore operation, or both based on the tuned predicted value (or a tuning factor, such as the tuning factor determined in block 410 of FIG. 4). The wellbore operation can be a second wellbore operation. The second wellbore operation can be the same as or different from the first wellbore operation in block 802. In some examples, the computing device 120 can use the tuned predicted value to optimize the second wellbore operation.

In some examples, the computing device 120 can use the tuned predicted value to determine a schedule for pulling a well tool out of a hole, sometimes referred to as a pulling out of hole (POOH) operation. The POOH schedule can include different speeds in which the well tool can be extracted from the wellbore based on a bit depth of the well tool in the wellbore. Pulling the well tool out of the wellbore at different speeds can reduce the likelihood of unwanted downhole events, such as the generation of a swab pressure that can cause a portion of the wellbore to collapse. The computing device 120 can also use additional parameters to more accurately determine the POOH schedule. For example, the computing device 120 can use a surface mud weight of 10.8 lbs/gallon, a pore pressure limit while swabbing of 10.2 lbs/gallon, and a final bit depth (MD) of 7000 ft to determine the POOH schedule.

Figures 9, 10:
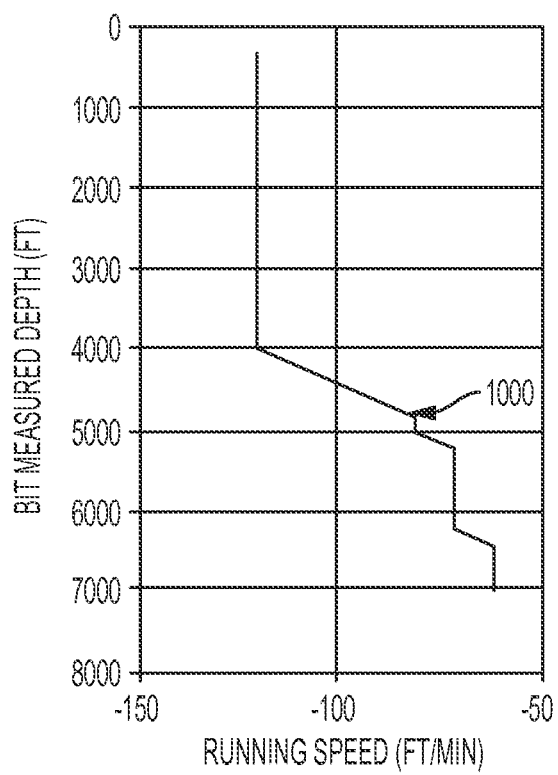
FIG. 9 shows a pulling out of hole (POOH) schedule generated using an untuned predicted ECD value according to some aspects.
FIG. 10 shows a graph representing the POOH schedule shown in FIG. 9.
Figures 11, 12:
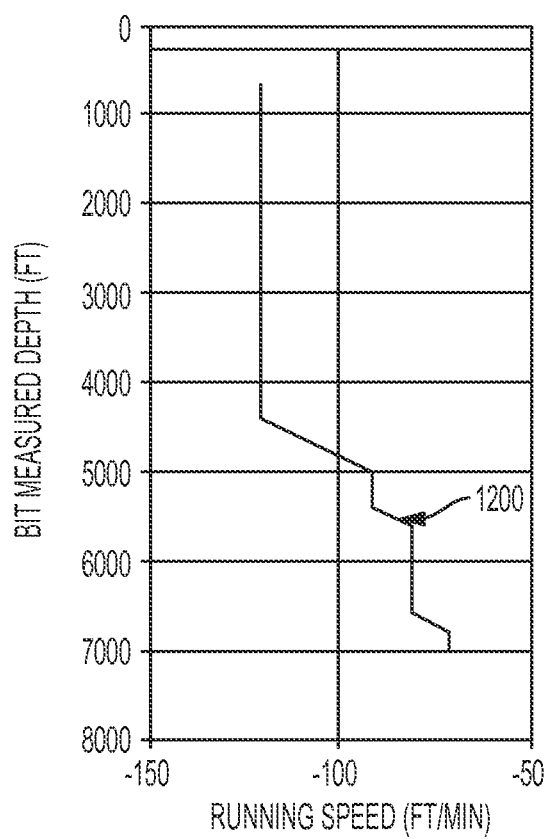
FIG. 11 shows a POOH schedule generated using a tuning factor of +0.05 lbs/gallon according to some aspects.
FIG. 12 shows a graph representing the POOH schedule shown in FIG. 11.

For comparison, FIG. 9 shows a POOH schedule generated using an untuned predicted ECD value (and the above additional parameters). The POOH schedule shows that, as the well tool is removed from the wellbore (e.g., as the bit depth decreases), the maximum running speed can increase. Although the maximum running speeds are shown as negative numbers because the well tool is being pulled out of the hole, the absolute value of the negative numbers indicates the actual speed. In some examples, the maximum running speed can be selected to keep the ECD as close to the 10.2 lbs/gallon pore pressure limit as is safely feasible. The POOH schedule of FIG. 9 is graphically represented in FIG. 10. As shown in FIG. 10, the maximum running speed (depicted by line 1000) can increase from −60 ft/min when the bit depth is at 7000 ft to −120 ft/min when the bit depth is at 4000 ft. The POOH schedule of FIGS. 9-10 can take approximately 465 minutes to complete. Conversely, FIG. 11 shows a POOH schedule generated using a tuning factor of +0.05 lbs/gallon (and the above additional constraints). The maximum running speed in the POOH schedule of FIG. 11 can be faster at each bit depth than in the POOH schedule of FIG. 9. The POOH schedule of FIG. 11 is graphically represented in FIG. 12. As shown in FIG. 12, the maximum running speed (depicted by line 1200) can increase from −70 ft/min when the bit depth is at 7000 ft to −120 ft/min when the bit depth is at 4400 ft. The POOH schedule of FIGS. 11-12 can take approximately 448 minutes to complete, which is seven minutes less than the POOH schedule shown in FIGS. 9-10. The seven minutes of saved time can generate substantial monetary savings for a well operator. For example, assuming a daily rate of $750,000 to $800,000 to operate a well ship, the seven minute difference can save the well operator around $3,800.

In block 806, the computing device 120 or the well operator performs a wellbore operation based on the tuned predicted value, the parameter value, or both. The wellbore operation can be a third wellbore operation. The third wellbore operation can be the same as or different from the first wellbore operation in block 802, the second wellbore operation in block 804, or both. In some examples, the well operator can perform a tripping operation (e.g., can pull the well tool out of the hole) in accordance with the POOH schedule of FIG. 11.

In some aspects, systems and methods for tuning predictions of wellbore operation parameters are provided according to one or more of the following examples:

Example #1: A system for use in a wellbore can include a computing device. The computing device can include a processing device and a memory device in which instructions executable by the processing device are stored. The instructions can be executable by the processing device for causing the processing device to generate a predicted value of a parameter associated with a well environment or a wellbore operation. The instructions can also cause the processing device to determine a tuning factor for adjusting the predicted value based on historical data. The instructions can cause the processing device to apply the tuning factor to the predicted value to generate a tuned predicted value. The instructions can further cause the processing device to generate an interface for display that includes a data point associated with the tuned predicted value plotted on a graph.

Example #2: The system of Example #1 may feature a sensor in electrical communication with the computing device and positionable proximate to the wellbore for measuring the parameter associated with the well environment or the wellbore operation. The historical data can include multiple differences between multiple predicted values of the parameter and multiple measured values of the parameter provided by the sensor.

Example #3: The system of Example #2 may feature the memory device including instructions executable by the processing device for causing the processing device to determine the tuning factor by applying linear regression analysis to the multiple differences.

Example #4: The system of any of Examples #2-3 may feature the memory device including instructions executable by the processing device for causing the processing device to determine the tuning factor by determining a moving average of a subset of the multiple differences.

Example #5: The system of any of Examples #1-4 may feature the memory device including instructions executable by the processing device for causing the processing device to determine a prediction interval associated with the tuned predicted value and plot a lower boundary of the prediction interval and an upper boundary of the prediction interval on the graph.

Example #6: The system of any of Examples #1-5 may feature the memory device including instructions executable by the processing device for causing the processing device to determine a parameter value associated the wellbore operation based on the tuned predicted value.

Example #7: The system of any of Examples #1-6 may feature the wellbore operation including at least one of running a pipe into the wellbore, circulating a fluid through the wellbore, cleaning the wellbore, connecting at least two well system components, slide drilling, or rotary drilling.

Example #8: A method can include generating, by a processing device, a predicted value of a parameter associated with a well environment or a wellbore operation. The method can also include determining, by the processing device, a tuning factor for adjusting the predicted value based on historical data. The method can also include applying, by the processing device, the tuning factor to the predicted value to generate a tuned predicted value. The method can further include generating, by the processing device, an interface for display that includes a data point associated with the tuned predicted value plotted on a graph.

Example #9: The method of Example #8 may feature generating the historical data by determining multiple differences between multiple predicted values of the parameter and multiple measured values of the parameter provided by a sensor positioned proximate to a wellbore.

Example #10: The method of Example #9 may feature determining the tuning factor by applying linear regression analysis to the multiple differences.

Example #11: The method of any of Examples #9-10 may feature determining the tuning factor by determining a moving average of the multiple differences.

Example #12: The method of any of Examples #8-11 may feature determining a prediction interval associated with the tuned predicted value and plotting a lower boundary of the prediction interval and an upper boundary of the prediction interval on the graph.

Example #13: The method of any of Examples #8-12 may feature determining a parameter value associated with the wellbore operation based on the tuned predicted value.

Example #14: The method of any of Examples #8-13 may feature the wellbore operation including at least one of running a pipe into a wellbore, circulating a fluid through the wellbore, cleaning the wellbore, connecting at least two well system components, slide drilling, or rotary drilling.

Example #15: A non-transient computer readable medium can include program code that is executable by a processor to cause the processor to generate a predicted value of a parameter associated with a well environment or a wellbore operation. The program code can also cause the processor to determine a tuning factor for adjusting the predicted value based on historical data. The program code can also cause the processor to apply the tuning factor to the predicted value to generate a tuned predicted value. The program code can also cause the processor to generate an interface for display that includes a data point associated with the tuned predicted value plotted on a graph.

Example #16: The non-transient computer readable medium of Example #15 may feature program code is executable by the processor to cause the processor to generate the historical data by determining multiple differences between multiple predicted values of the parameter and multiple measured values of the parameter provided by a sensor positioned proximate to a wellbore.

Example #17: The non-transient computer readable medium of Example #16 may feature program code executable by the processor for causing the processor to determine the tuning factor by (i) applying linear regression analysis to the multiple differences or (ii) determining a moving average of the multiple differences.

Example #18: The non-transient computer readable medium of any of Examples #15-17 may feature program code executable by the processor to cause the processor to determine a prediction interval associated with the tuned predicted value and plot a lower boundary of the prediction interval and an upper boundary of the prediction interval on the graph.

Example #19: The non-transient computer readable medium of any of Examples #15-18 may feature program code executable by the processor to cause the processor to determine a parameter value associated the wellbore operation based on the tuned predicted value.

Example #20: The non-transient computer readable medium of any of Examples #15-19 may feature the wellbore operation including at least one of running a pipe into a wellbore, circulating a fluid through the wellbore, cleaning the wellbore, connecting at least two well system components, slide drilling, or rotary drilling.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system for use in a wellbore, the system comprising:
a computing device including a processing device and a memory device in which instructions executable by the processing device are stored for causing the processing device to:
generate a predicted value of a parameter associated with a well environment or a wellbore operation;
determine a tuning factor for adjusting the predicted value based on historical data;
apply the tuning factor to the predicted value to generate a tuned predicted value; and
generate an interface for display that includes a data point associated with the tuned predicted value plotted on a graph.

2. The system of claim 1, further comprising a sensor in electrical communication with the computing device and positionable proximate to the wellbore for measuring the parameter associated with the well environment or the wellbore operation, wherein the historical data comprises a plurality of differences between a plurality of predicted values of the parameter and a plurality of measured values of the parameter provided by the sensor.

3. The system of claim 2, wherein the memory device comprises instructions executable by the processing device for causing the processing device to determine the tuning factor by applying linear regression analysis to the plurality of differences.

4. The system of claim 2, wherein the memory device comprises instructions executable by the processing device for causing the processing device to determine the tuning factor by determining a moving average of a subset of the plurality of differences.

5. The system of claim 1, wherein the memory device comprises instructions executable by the processing device for causing the processing device to determine a prediction interval associated with the tuned predicted value and plot a lower boundary of the prediction interval and an upper boundary of the prediction interval on the graph.

6. The system of claim 1, wherein the memory device comprises instructions executable by the processing device for causing the processing device to determine a parameter value associated with the wellbore operation based on the tuned predicted value.

7. The system of claim 6, wherein the wellbore operation comprises at least one of running a pipe into the wellbore, circulating a fluid through the wellbore, cleaning the wellbore, connecting at least two well system components, slide drilling, or rotary drilling.

8. A method comprising:
generating, by a processing device, a predicted value of a parameter associated with a well environment or a wellbore operation;
determining, by the processing device, a tuning factor for adjusting the predicted value based on historical data;
applying, by the processing device, the tuning factor to the predicted value to generate a tuned predicted value; and
generating, by the processing device, an interface for display that includes a data point associated with the tuned predicted value plotted on a graph.

9. The method of claim 8, further comprising generating the historical data by determining a plurality of differences between a plurality of predicted values of the parameter and a plurality of measured values of the parameter provided by a sensor positioned proximate to a wellbore.

10. The method of claim 9, further comprising determining the tuning factor by applying linear regression analysis to the plurality of differences.

11. The method of claim 9, further comprising determining the tuning factor by determining a moving average of the plurality of differences.

12. The method of claim 8, further comprising determining a prediction interval associated with the tuned predicted value and plotting a lower boundary of the prediction interval and an upper boundary of the prediction interval on the graph.

13. The method of claim 8, further comprising determining a parameter value associated with the wellbore operation based on the tuned predicted value.

14. The method of claim 13, wherein the wellbore operation comprises at least one of running a pipe into a wellbore, circulating a fluid through the wellbore, cleaning the wellbore, connecting at least two well system components, slide drilling, or rotary drilling.

15. A non-transient computer readable medium comprising program code that is executable by a processor to cause the processor to:
generate a predicted value of a parameter associated with a well environment or a wellbore operation;
determine a tuning factor for adjusting the predicted value based on historical data;
apply the tuning factor to the predicted value to generate a tuned predicted value; and
generate an interface for display that includes a data point associated with the tuned predicted value plotted on a graph.

16. The non-transient computer readable medium of claim 15, wherein the program code is executable by the processor to cause the processor to:
generate the historical data by determining a plurality of differences between a plurality of predicted values of the parameter and a plurality of measured values of the parameter provided by a sensor positioned proximate to a wellbore.

17. The non-transient computer readable medium of claim 16, wherein the program code is executable by the processor to cause the processor to determine the tuning factor by (i)

applying linear regression analysis to the plurality of differences or (ii) determining a moving average of the plurality of differences.

18. The non-transient computer readable medium of claim 15, wherein the program code is executable by the processor to cause the processor to determine a prediction interval associated with the tuned predicted value and plot a lower boundary of the prediction interval and an upper boundary of the prediction interval on the graph.

19. The non-transient computer readable medium of claim 15, wherein the program code is executable by the processor to cause the processor to determine a parameter value associated with the wellbore operation based on the tuned predicted value.

20. The non-transient computer readable medium of claim 19, wherein the wellbore operation comprises at least one of running a pipe into a wellbore, circulating a fluid through the wellbore, cleaning the wellbore, connecting at least two well system components, slide drilling, or rotary drilling.

* * * * *